(12) United States Patent
Hung

(10) Patent No.: US 7,446,520 B2
(45) Date of Patent: Nov. 4, 2008

(54) PWM CONTROLLER FOR A VOLTAGE REGULATOR

(75) Inventor: Huan-Jan Hung, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 201 days.

(21) Appl. No.: 11/210,769

(22) Filed: Aug. 25, 2005

(65) Prior Publication Data

US 2006/0043955 A1   Mar. 2, 2006

(30) Foreign Application Priority Data

Aug. 26, 2004   (TW) .............................. 93125506 A

(51) Int. Cl.
*G05F 1/00* (2006.01)
(52) U.S. Cl. ...................... 323/288; 323/284
(58) Field of Classification Search ................ 323/222, 323/282, 283, 284, 288
See application file for complete search history.

(56) References Cited

U.S. PATENT DOCUMENTS

| | | | |
|---|---|---|---|
| 5,781,000 A * | 7/1998 | Saeki et al. .................. 323/234 |
| 6,215,290 B1 * | 4/2001 | Yang et al. ................... 323/282 |
| 6,680,604 B2 * | 1/2004 | Muratov et al. ............. 323/285 |
| 6,912,144 B1 * | 6/2005 | Clavette ....................... 363/98 |
| 6,965,223 B1 * | 11/2005 | MacLean et al. ............ 323/284 |
| 2004/0008011 A1 * | 1/2004 | Wang et al. .................. 323/213 |
| 2004/0135567 A1 * | 7/2004 | Fukui ........................... 323/288 |
| 2005/0194952 A1 * | 9/2005 | Carpenter et al. ........... 323/283 |

* cited by examiner

*Primary Examiner*—Akm E Ullah
*Assistant Examiner*—Ramy Ramadan
(74) *Attorney, Agent, or Firm*—Rosenberg, Klein & Lee

(57) ABSTRACT

A PWM controller for a voltage regulator comprises an error amplifier to generate an error signal from a difference between the output voltage of the voltage regulator and a reference voltage, and a comparator to compare the error signal with a ramp signal to generate a PWM signal to switch the pair of high side and low side switches of the voltage regulator to produce the output voltage and an output current. When the output current is greater than a threshold, the PWM controller adjusts the reference voltage or the frequency of the ramp signal to reduce the frequency of the PWM signal, thereby reducing the switching loss caused by the switches.

4 Claims, 5 Drawing Sheets

PWM CONTROLLER FOR A VOLTAGE REGULATOR

FIELD OF THE INVENTION

The present invention is related generally to a voltage regulator and more particularly to a pulse width modulation (PWM) controller for a voltage regulator.

BACKGROUND OF THE INVENTION

Voltage regulator has been applied in various electronic products to serve as power supply for providing stable supply voltages. FIG. 1 schematically shows a typical voltage regulator 100, which comprises a pair of high side transistor 102 and low side transistor 104 coupled between input voltage Vin and ground GND to be alternatively switched by PWM controller 105 to produce an output current Iout flowing through an inductor L to charge an output capacitor C1 to produce an output voltage Vout. In the PWM controller 105, current sense circuit 116 senses the output current Iout to generate a current sense signal Isen supplied for a reference voltage generator 110 to generate a reference voltage Vref, error amplifier 108 generates an error signal EA from the difference between the output voltage Vout and reference voltage Vref for a comparator 112 to compare with ramp signal Vramp provided by ramp generator 114 to produce pulse width modulation signal PWM for driver 106 to switch the transistor 102 and 104. FIG. 2 shows a functional block diagram of the reference voltage generator 110, in which digital to analog converter (DAC) 118 converts digital signal VID to analog voltage V1, the current sense signal Isen inputs to droop unit 122 to generate droop voltage Vdroop, offset unit 120 provides offset voltage Voffset, and those voltages V1, Vdroop and Voffset are combined together by summing circuit 124 to generate the reference voltage Vref.

When load on the voltage regulator 100 changes from light to heavy, mass heat will be generated from various sources, such as switching loss, conduction loss, charging/discharging, and inductor loss, among which the heat caused by conduction loss, charging/discharging, and inductor loss is dependent on hardware, and the total heat could be reduced by reducing switching loss.

Therefore, it is desired a PWM controller for a voltage regulator to reduce the switching loss of the voltage regulator.

SUMMARY OF THE INVENTION

One object of the present invention is to provide a PWM controller for a voltage regulator.

Another object of the present invention is to provide a PWM controller for a voltage regulator to reduce the switching loss of the voltage regulator.

In a voltage regulator comprising a pair of high side and low side switches alternatively switched to generate an output current and an output voltage, according to the present invention, a PWM controller comprises a reference voltage generator to provide a reference voltage, and error amplifier to generate an error signal from a difference between the output voltage and reference voltage, a comparator to compare the error signal with a ramp signal to generate a PWM signal to switch the pair of switches, wherein the reference voltage generator comprises an offset unit to provide an offset voltage to adjust the reference voltage to thereby push the output voltage higher when the output current is greater than a threshold. Preferably, the threshold is determined by an adjustment circuit.

In a voltage regulator comprising a pair of high side and low side switches alternatively switched to generate an output current and an output voltage, according to the present invention, a PWM controller comprises an error amplifier to generate an error signal from a difference between the output voltage and a reference voltage, a ramp generator to provide a ramp signal, a comparator to compare the error signal with the ramp signal to generate a PWM signal to switch the pair of switches, wherein a frequency of the ramp signal is decreased to thereby decrease a frequency of the PWM signal when the output current is greater than a threshold, and therefore switching loss is reduced. Preferably, the threshold is determined by an adjustment circuit.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
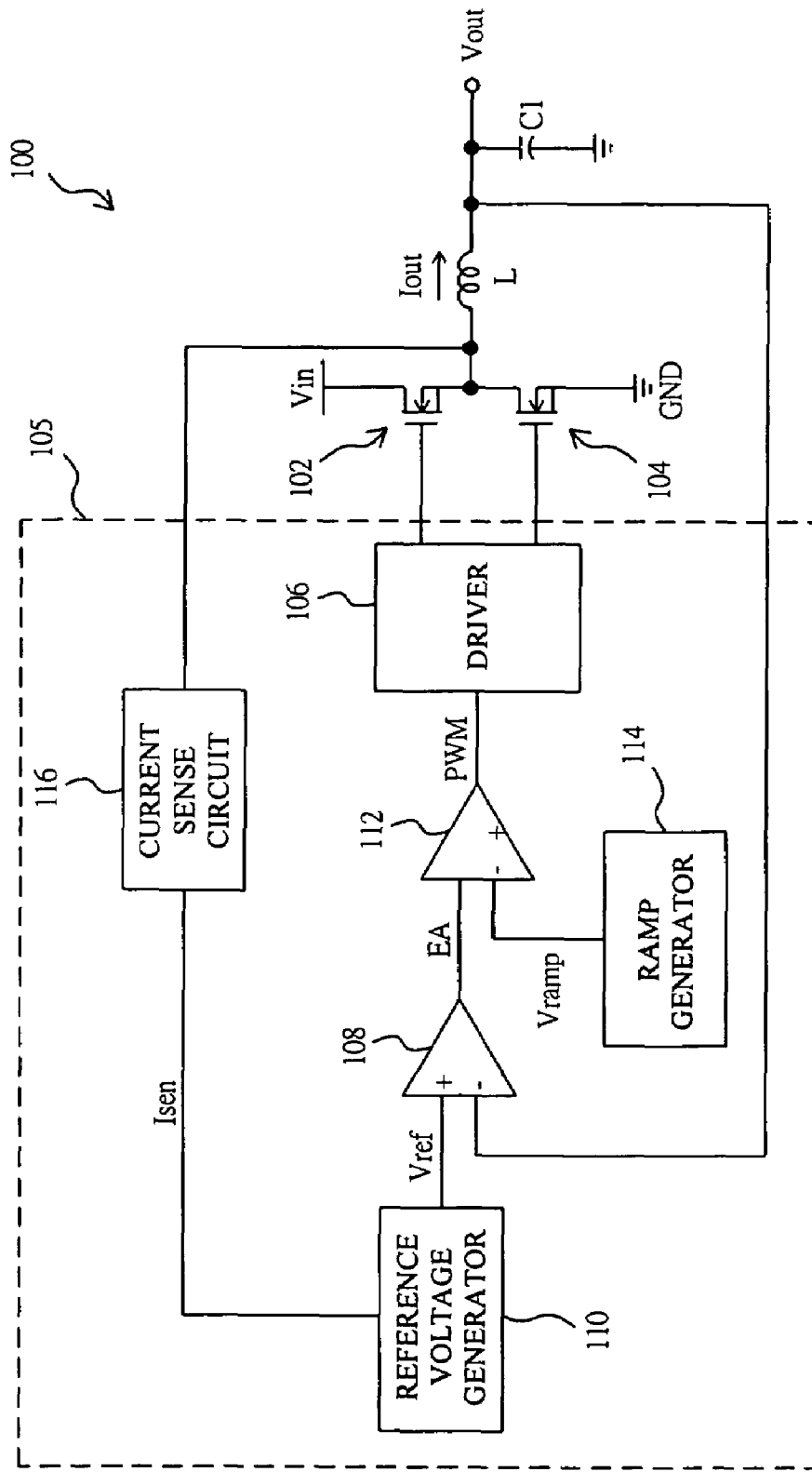
FIG. 1 schematically shows a typical voltage regulator.
Figure 2:
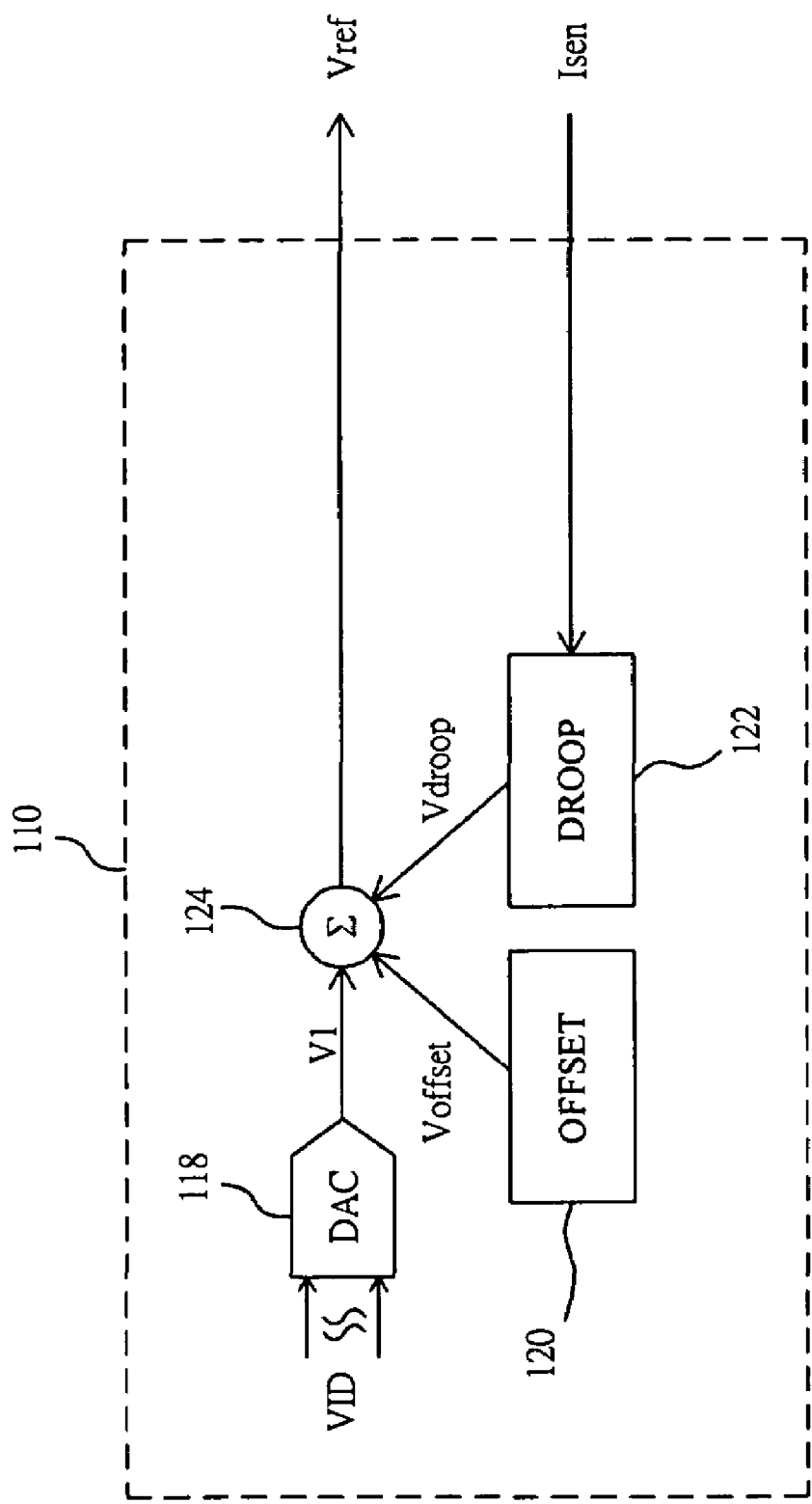
FIG. 2 shows a functional block diagram of the reference voltage generator in the voltage regulator of FIG. 1.
Figure 3:
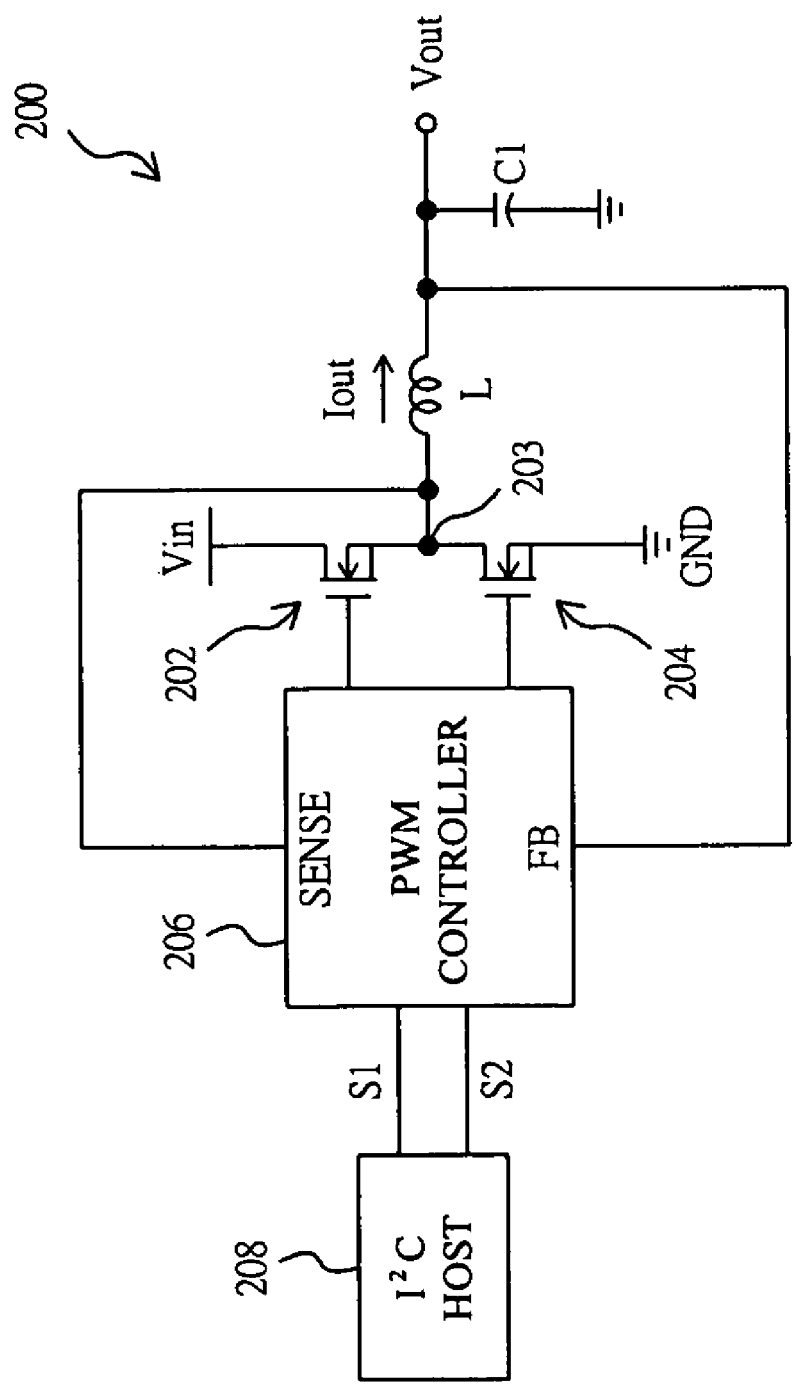
FIG. 3 shows a voltage regulator using a PWM controller chip according to the present invention.

FIG. 3 shows a voltage regulator 200 using a PWM controller chip 206 according to the present invention. The voltage regulator 200 comprises a pair of high side transistor 202 and low side transistor 204 coupled in series between input voltage Vin and ground GND to be alternatively switched by the PWM controller chip 206 to produce an output current Iout flowing through inductor L to charge output capacitor C1 to produce output voltage Vout. The PWM controller chip 206 has a feedback pin FB coupled with the output voltage Vout, and a current sense pin SENSE coupled to the phase node 203 between the transistors 202 and 204. In addition, I²C host 208 outputs digital circuit interface signals S1 and S2 to the PWM controller chip 206 to adjust the frequency of switching the transistors 202 and 204.

Figure 4:
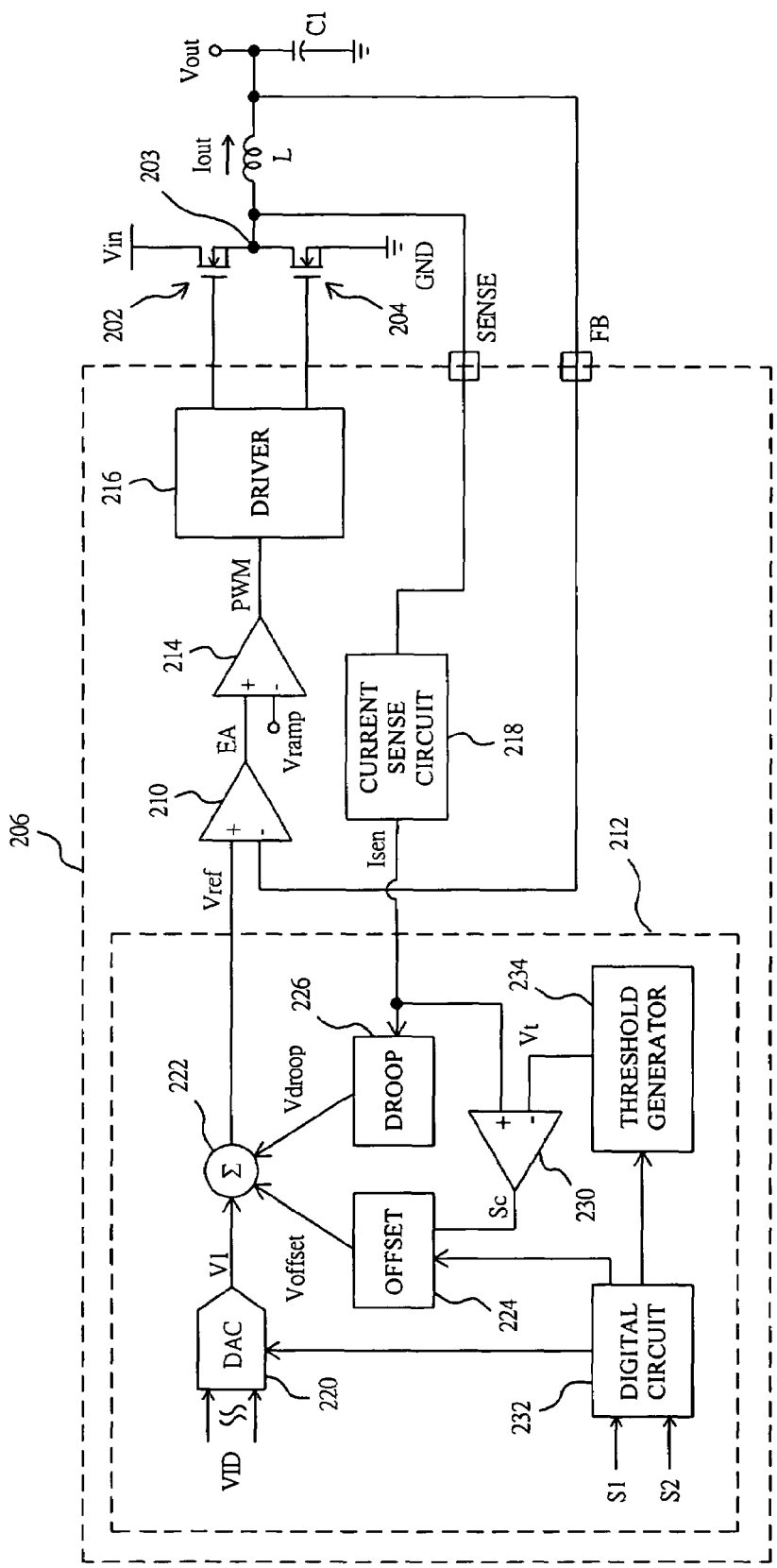
FIG. 4 shows first embodiment according to the present invention.

FIG. 4 shows first embodiment for the PWM controller chip 206 shown in FIG. 3, in which error amplifier 210 generates an error signal EA from a difference between the output voltage Vout and a reference voltage Vref, comparator 214 compares the error signal EA with a ramp signal Vramp to generate a PWM signal PWM for driver 216 to switch the transistors 202 and 204, and current sense circuit 218 senses the output current Iout via the current sense pin SENSE to generate a current sense signal Isen. In reference voltage generator 212 to provide the reference voltage Vref, DAC 220 converts digital signal VID to analog voltage V1, the current sense signal Isen inputs to droop unit 226 to produce droop voltage Vdroop, and summing circuit 222 combines the voltages V1 and Vdroop with offset voltage Voffset provided by offset unit 224 to produce the reference voltage Vref. For the offset unit 224 to produce the offset voltage Voffset, comparator 230 compares the current sense signal Isen with a threshold Vt provided by threshold generator 234 to produce comparison signal Sc supplied to the offset unit 224. Digital circuit 232 serves as adjustment circuit to control the threshold generator 234 to adjust the threshold Vt based on the digital circuit interface signals S1 and S2. When load on the voltage regulator 200 changes from light to heavy, the output current Iout increases eventually, and the current sense signal Isen rises accordingly. Once the current sense signal Isen reaches the threshold Vt, the comparator 230 signals the offset unit 224 to adjust the offset voltage Voffset, thereby to increase the level of the reference voltage Vref, and to further push the output voltage Vout higher. As a result, the stability is improved during heavy load.

Figure 5:
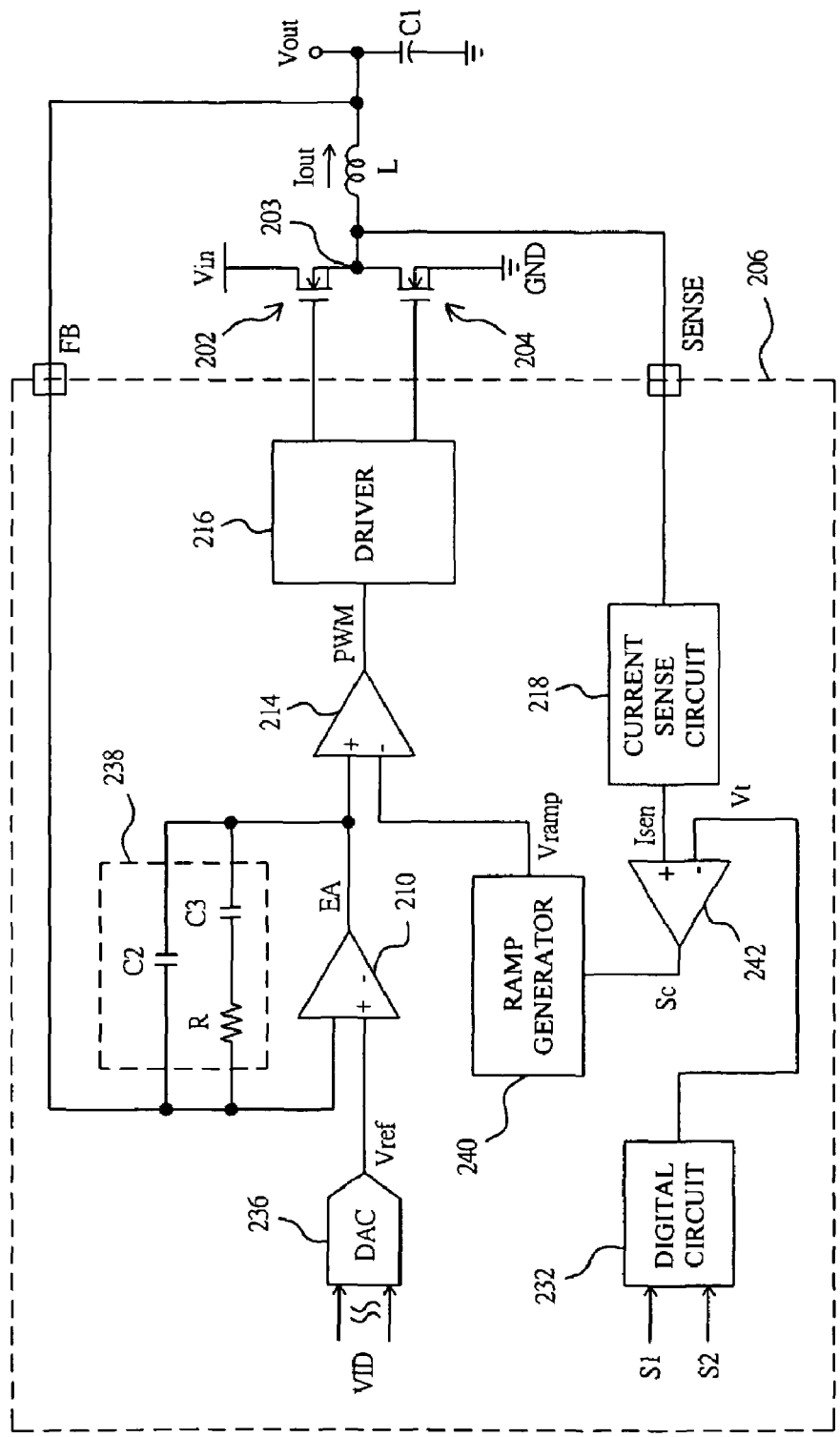
FIG. 5 shows second embodiment according to the present invention.

FIG. 5 shows second embodiment for the PWM controller chip 206 shown in FIG. 3, which also comprises the error amplifier 210, comparator 214, driver 216, current sense circuit 218, and digital circuit 232. However, in this embodiment, DAC 236 converts digital signal VID to reference voltage Vref for the error amplifier 210 to compare with the output voltage Vout to generate error signal EA, the error signal EA is compensated by compensation circuit 238 and supplied to the comparator 214 to compare with the ramp signal Vramp provided by ramp generator 240, and PWM signal PWM is generated accordingly. For the ramp generator 240 to produce the ramp signal Vramp, comparator 242 compares the current sense signal Isen with threshold Vt to produce comparison signal Sc supplied to the ramp generator 240. The threshold Vt is determined by the digital circuit 232 according to the digital circuit interface signals S1 and S2. When load on the voltage regulator 200 changes from light to heavy, the output current Iout increases eventually, and the current sense signal Isen rises accordingly. Once the current sense signal Isen reaches the threshold Vt, the ramp generator 240 decreases the frequency of the ramp signal Vramp in response to the comparison signal Sc, thereby to decrease the frequency of the PWM signal PWM, and to further decrease the switching times of the transistors 202 and 204. As a result, the switching loss is reduced.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A PWM controller for a voltage regulator including a pair of high side and low side switches alternatively switched to generate an output current and an output voltage, comprising:
    an error amplifier for generating an error signal from a difference between the output voltage and a reference voltage;
    a ramp generator for providing a ramp signal;
    a control circuit coupled to the ramp generator, the control circuit reducing a frequency of the ramp signal responsive to a signal corresponding to the output current being greater than a threshold value to thereby increase the output voltage under heavy load conditions; and
    a comparator for comparing the error signal with the ramp signal to generate a PWM signal to switch the pair of switches.

2. The PWM controller of claim 1, further comprising an adjustment circuit for adjusting the threshold value.

3. A control method for a voltage regulator including a pair of high side and low side switches alternatively switched to generate an output current and an output voltage, comprising the steps of:
    generating an error signal from a difference between the output voltage and a reference voltage;
    providing a ramp signal;
    decreasing a frequency of the ramp signal responsive to a signal corresponding to the output current being greater than a threshold value to thereby increase the output voltage under heavy load conditions; and
    comparing the error signal with the ramp signal to generate a PWM signal to switch the pair of switches.

4. The method of claim 3, further comprising adjusting the threshold value.

* * * * *